United States Patent
Turner et al.

[19]

[11] Patent Number: 6,082,788
[45] Date of Patent: Jul. 4, 2000

[54] PUSH-TO-CLOSE LATCH

[75] Inventors: D. Dale Turner, Honeoye Falls, N.Y.; Stuart Kevan Buckland, Malvern, United Kingdom

[73] Assignee: Southco, Inc., Concordville, Pa.

[21] Appl. No.: 09/286,023

[22] Filed: Apr. 5, 1999

[51] Int. Cl.[7] .................................................. E05C 19/00
[52] U.S. Cl. ................. 292/303; 292/301; 292/DIG. 38; 411/45; 411/349
[58] Field of Search .................................. 292/300, 301, 292/DIG. 53, 90, 87, 303, DIG. 38; 411/48, 45, 46, 349, 549, 338, 339, 510, 7, 324, 348, 410

[56] References Cited

U.S. PATENT DOCUMENTS

| | | | |
|---|---|---|---|
| 2,252,286 | 8/1941 | Hathorn | 411/349 |
| 2,460,613 | 2/1949 | Whelan et al. | 292/251 |
| 3,073,206 | 1/1963 | Rudolph | 411/410 |
| 3,552,066 | 1/1971 | Sorensen | 411/349 |
| 4,061,373 | 12/1977 | Revell | 292/251 |
| 4,544,191 | 10/1985 | Nakama | 292/341.15 |
| 4,600,344 | 7/1986 | Sutenbach et al. | 411/435 |
| 4,647,093 | 3/1987 | Palsson | 292/251 |
| 4,770,582 | 9/1988 | Junemann et al. | 411/182 |
| 4,826,379 | 5/1989 | Norden | 411/366 |
| 4,832,551 | 5/1989 | Wollar | 411/280 |
| 5,190,424 | 3/1993 | Kazino et al. | 411/171 |
| 5,454,676 | 10/1995 | Conte | 411/339 |
| 5,540,528 | 7/1996 | Schmidt et al. | 411/55 |
| 5,603,535 | 2/1997 | Latch | 292/128 |
| 5,606,883 | 3/1997 | Svec | 70/370 |

OTHER PUBLICATIONS

Milk jug cap plastic milk jug where cap is installed by milk bottler by pressing plastic cap onto plastic bottle and were user unscrews cap to open. See attached photo.

*Primary Examiner*—B. Dayoan
*Assistant Examiner*—Clifford B Vaterlaus
*Attorney, Agent, or Firm*—Paul & Paul

[57] ABSTRACT

A latch for attaching a door to a frame, having a latch stud secured to the door having a threaded stud portion and a head portion, the head portion having a driver recess to facilitate axial rotation, and a stud receptacle secured to the frame having a threaded latch stud captivator that allows the latch stud to be longitudinally inserted into said latch stud captivation means and requires the latch stud to be manually axially rotated for removal from the threaded stud captivation means.

4 Claims, 6 Drawing Sheets

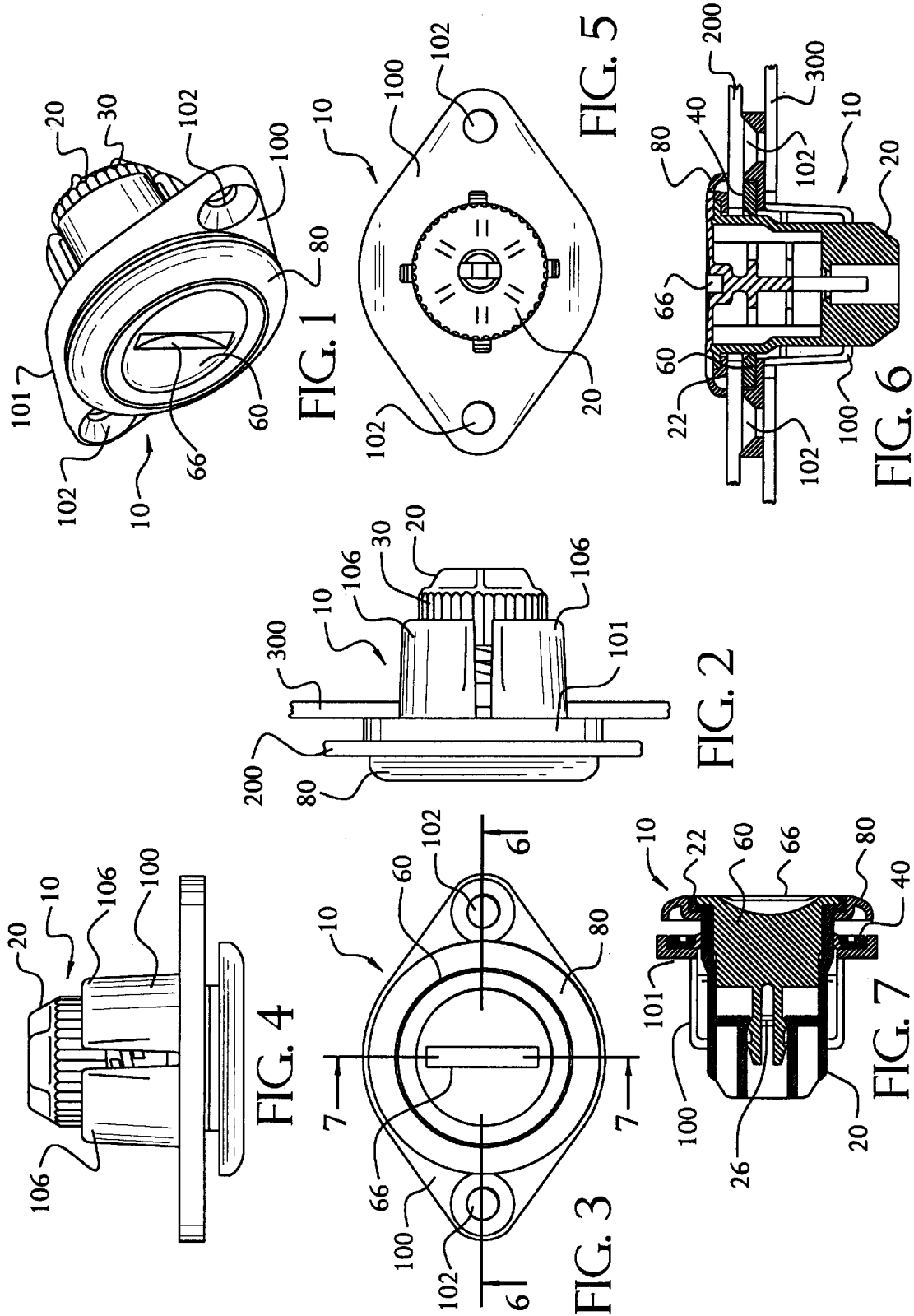

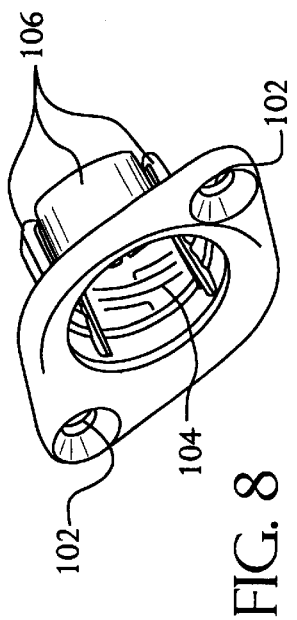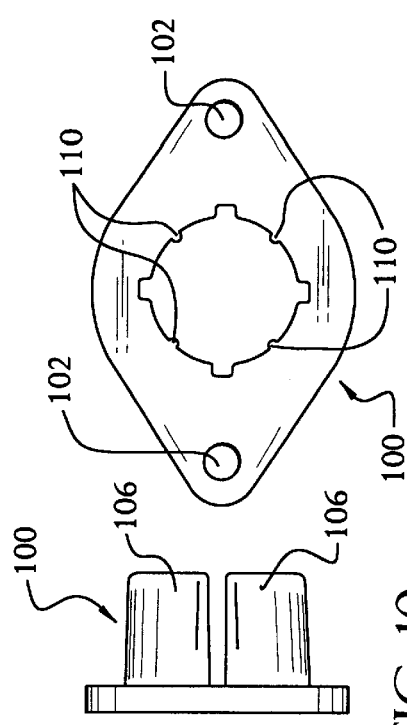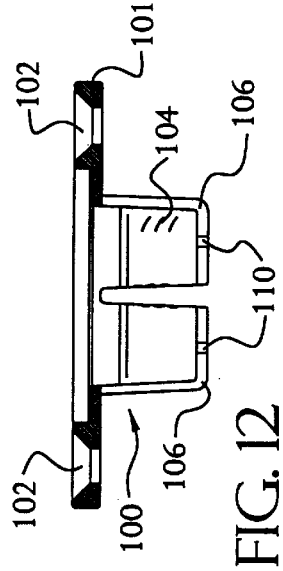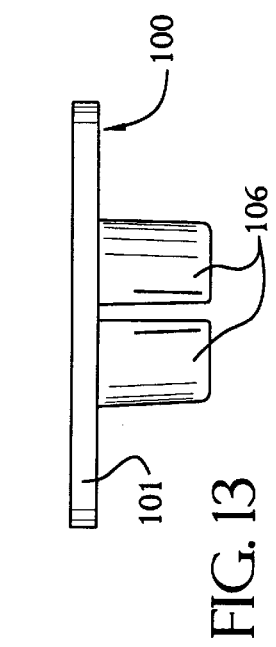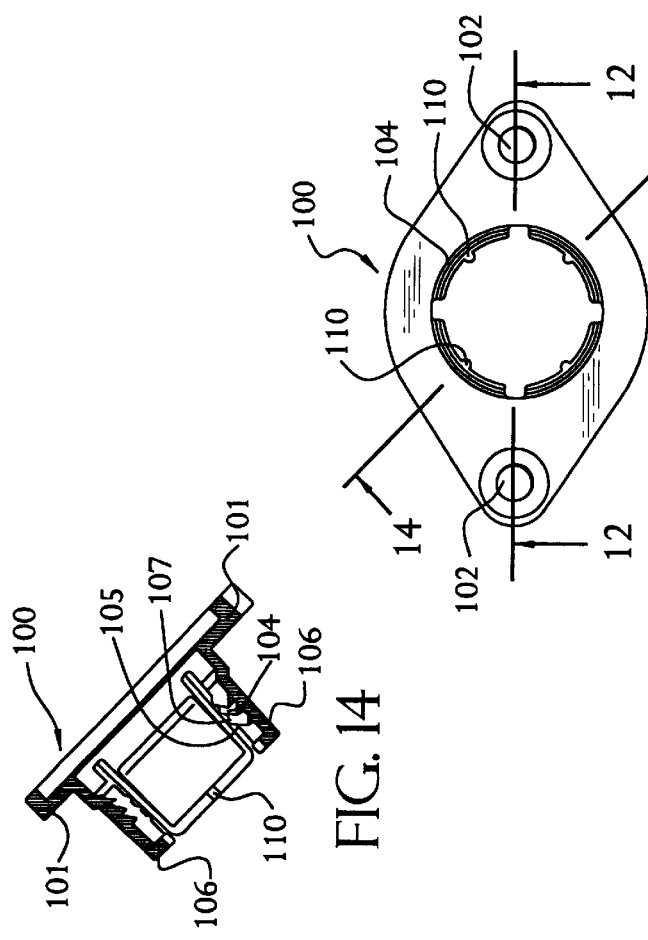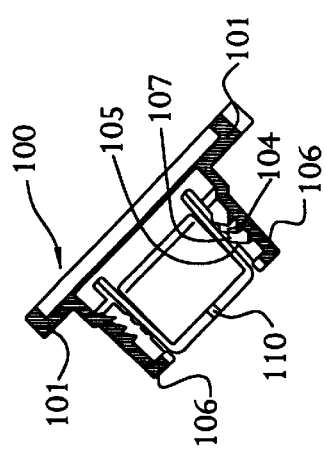

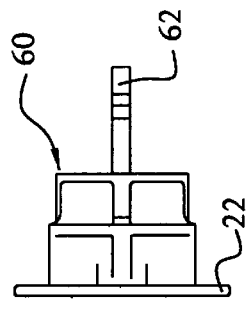
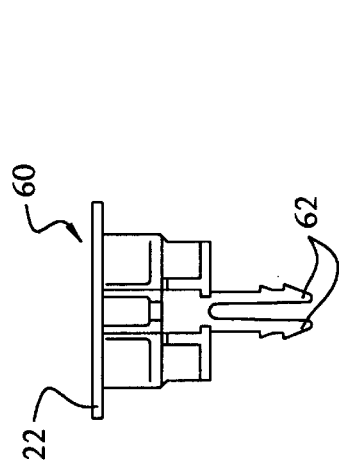
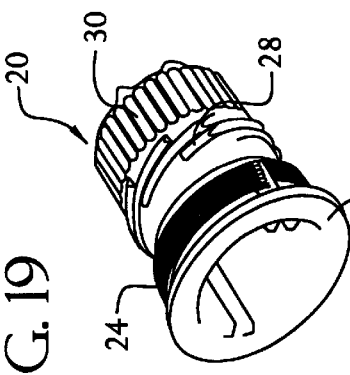
FIG. 20
FIG. 19
FIG. 15
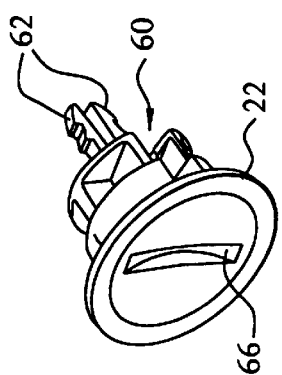
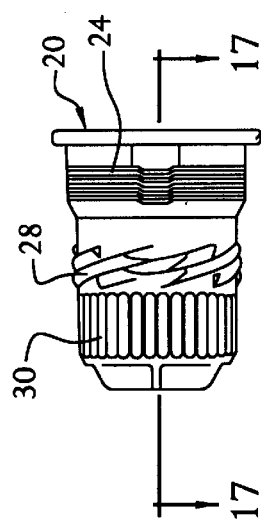
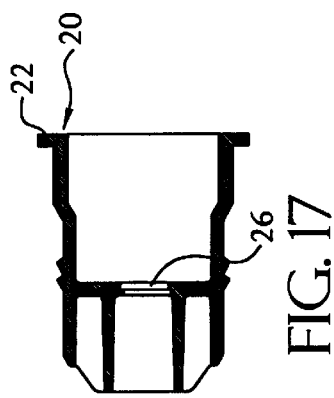
FIG. 18
FIG. 16
FIG. 17

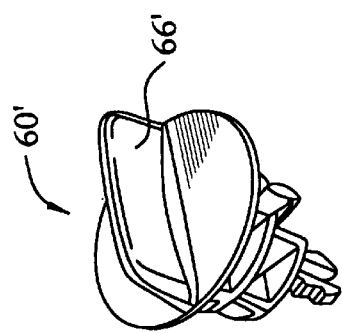
FIG. 38
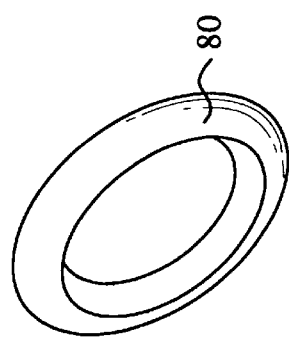
FIG. 27
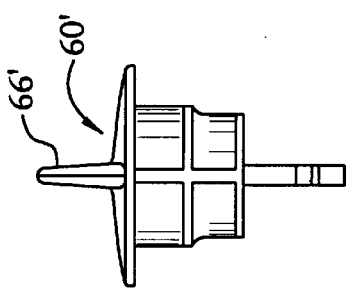
FIG. 39
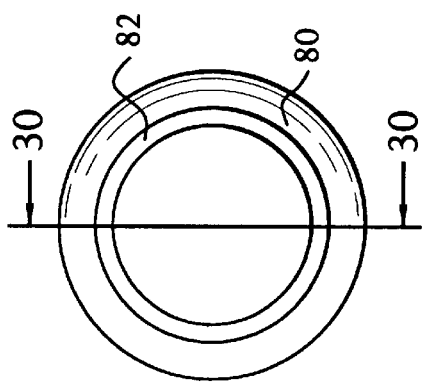
FIG. 28
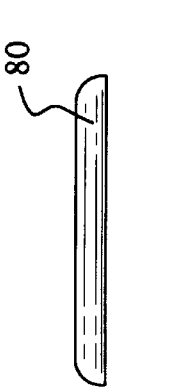
FIG. 29
FIG. 30

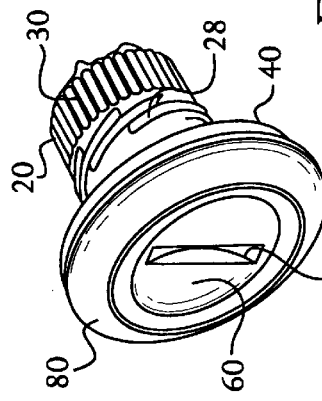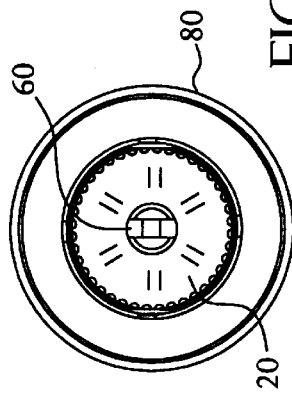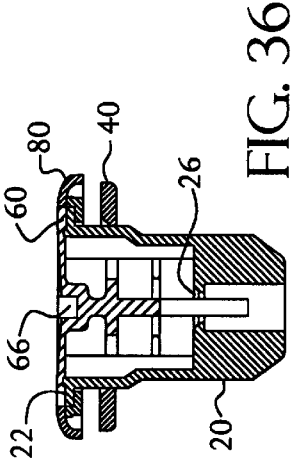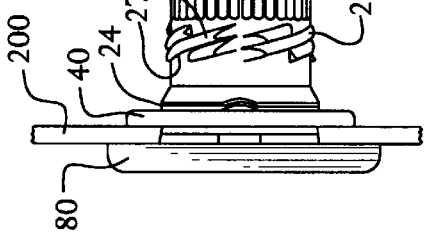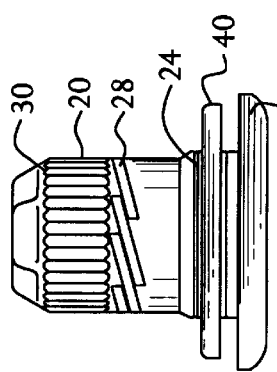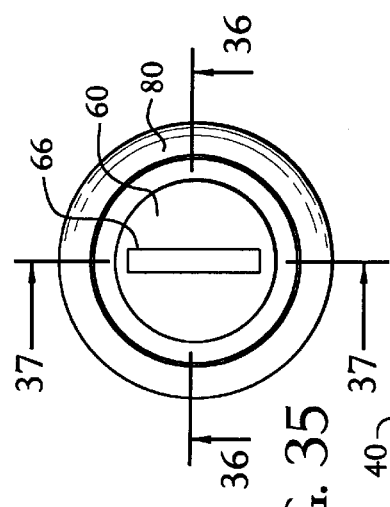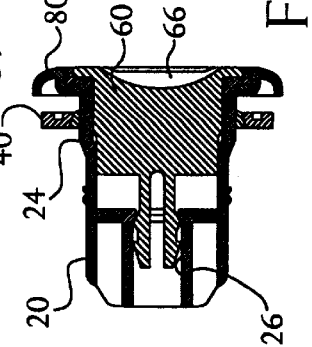

6,082,788

PUSH-TO-CLOSE LATCH

The present invention is directed to latches in general, and, more particularly to a latch that "slams shut" to engage, but must be opened manually.

BACKGROUND OF THE INVENTION

Latches, for doors, enclosures and the like are well known that may be pushed to close, but then require rotation to open. For example, a majority of standard doors for a houses operate in this manner. Additionally, various latches are known that may be slammed shut to engage the latch, then require a manual operation to disengage the latch. However, these many of these latches are typically complex, heavy, do not have a compression feature whereby the door may be compressed down by operation of the latch to fully secure the door to a frame, are relatively expensive, and require a multitude of parts for their assembly. Other devices that slam to close, but require manual rotation to open exist, for example, a lid for a typical plastic milk jug where, during bottling at a bottling plant, the lid is pressed on, but the user then must rotate the lid to remove or reinstall it.

The present invention is for a novel push-to-close latch that may be used in a multitude of different applications that is of simple design and is easily manufactured at very low cost. The present latch is extremely easy to operate and accommodates various means to engage and disengage the latch mechanism.

SUMMARY OF THE INVENTION

The present invention is directed to a latch that may be slammed shut to engage the latch, but requires manual rotation of a member of the latch to disengage the latch. The latch of the present invention is for attaching a door to a frame. The latch has a latch stud secured to the door having a threaded stud portion and a head portion, the head portion having a driver recess to facilitate axial rotation, and a stud receptacle secured to the frame having a threaded latch stud captivator that allows the latch stud to be longitudinally inserted into said latch stud captivation means and requires the latch stud to be manually axially rotated for removal from the threaded stud captivation means.

It is therefore an object of the present invention to provide a new and improved latch that allows a door to be slammed to engage the latch, but requires manual disengagement of the latch.

It is a further object of the present invention to provide a new and improved latch that may be pushed to close, then further compressed to a fully latched position by manual rotation.

It is a still further object of the present invention to provide a new and improved latch that may be either pushed closed or operated manually to engage the latch.

It is yet a further object of the present invention to provide a new and improved latch that is resistant to disengagement by vibration.

It is a further object of the present invention to provide a new and improved latch that is inexpensive to mass produce, yet still providing reliable service, It is a still further object of the present invention to provide a new and improved latch that may be entirely molded out of an engineering plastic material.

It is yet another object of the present invention to provide a new and improved latch that requires minimal rotation to disengage the latch.

It is a further object of the present invention to provide a new and improved latch that may be compressed to a fully engaged position with minimal rotation.

Other objects and advantages of the present invention will become apparent from the following description taken in conjunction with the accompanying drawings.

BRIEF DESCRIPTION OF THE DRAWINGS

FIG. 1 is a perspective view of the push-to-close latch of the present invention.

FIG. 2 is a side elevation view of the push-to-close latch of FIG. 1 depicted as mounted.

FIG. 3 is a top plan view of the push-to-close latch of FIG. 1.

FIG. 4 is a rear elevation view of the push-to-close latch of FIG. 1.

FIG. 5 is a bottom view of the push-to-close latch of FIG. 1.

FIG. 6 is a cross-sectional view of the push-to-close latch of FIG. 1, taken substantially along line 6—6 of FIG. 3, depicted as mounted.

FIG. 7 is a cross-sectional view of the push-to-close latch of FIG. 1, taken substantially along line 7—7 of FIG. 3.

FIG. 8 is a perspective view of the a stud receptacle as used on the push-to-close latch of FIG. 1.

FIG. 9 is a bottom view of the stud receptacle of FIG. 8.

FIG. 10 is a side elevation view of the stud receptacle of FIG. 8.

FIG. 11 Is a top plan view of the stud receptacle of FIG. 8.

FIG. 12 is a cross-sectional view of the stud receptacle of FIG. 8, taken substantially along line 12—12 of FIG. 11.

FIG. 13 is a front elevation view of the stud receptacle of FIG. 8.

FIG. 14 is a cross sectional view of the stud receptacle of FIG. 8 taken substantially along line 14—14 of FIG. 11.

FIG. 15 perspective view of a latch stud as used on the push-to-close latch of FIG. 1.

FIG. 16 is a side elevation view of the latch stud of FIG. 15.

FIG. 17 is a cross-sectional view of the latch stud of FIG. 15, taken substantially along line 17—17 of FIG. 16.

FIG. 18 is a perspective view of a latch stud driver as used on the push-to-close latch of FIG. 1.

FIG. 19 is a front elevation view of the latch stud driver of FIG. 18.

FIG. 20 is side elevation view of the latch stud driver of FIG. 18.

FIG. 27 is a perspective view of a bezel as used on the push-to-close latch of FIG. 1.

FIG. 28 is a top plan view of the bezel of FIG. 27.

FIG. 29 is a side elevation view of the bezel of FIG. 27.

FIG. 30 is a cross-sectional view of the bezel of FIG. 27, taken substantially along line 30—30 of FIG. 28.

FIG. 31 is a perspective view of the latch stud, latch stud driver, bezel, and retaining ring assembly of FIG. 1.

FIG. 32 is a front elevation view of the latch stud, latch stud driver, bezel, and retaining ring assembly of FIG. 31.

FIG. 33 is a elevation view of the latch stud, latch stud driver, bezel, and raining ring assembly of FIG. 31, depicted as mounted on a panel.

FIG. 34 is a bottom view of the latch stud, latch stud driver, bezel, and retaining ring assembly of FIG. 31.

FIG. 35 is a top plan view of the latch stud, latch stud driver, bezel and retaining ring assembly of FIG. 31.

FIG. 36 is a cross-sectional view of the latch stud, latch stud driver, bezel and retaining ring assembly of FIG. 31, taken substantially along line 36—36 of FIG. 35.

FIG. 37 is a cross-sectional view of the latch stud, latch stud driver, bezel and retaining ring assembly of FIG. 31, taken substantially along line 37—37 of FIG. 35.

FIG. 38 is a perspective view of an alternate embodiment of a latch stud driver for use on the push-to-close latch of FIG. 1.

FIG 39 is a front elevation view of the latch stud driver of FIG. 38.

DETAILED DESCRIPTION OF THE PREFERRED EMBODIMENT

Figure 21:
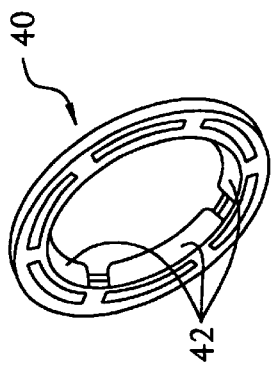
FIG. 21 is a perspective view of a retaining ring as used on the push-to-close latch of FIG. 1.
Figure 22:
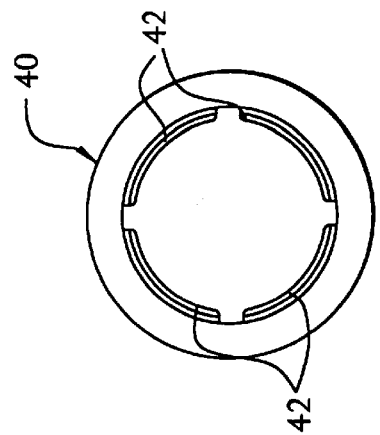
FIG. 22 is a bottom view of the retaining ring of FIG. 21.
Figure 23:
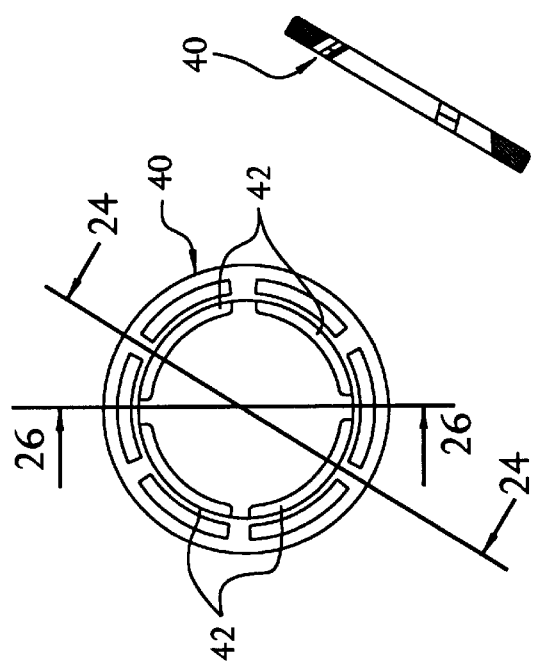
FIG. 23 is a top plan view of the retaining ring of FIG. 21.
Figure 24:
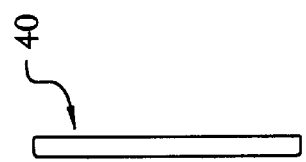
FIG. 24 is a cross-sectional view of the retaining ring of FIG. 21, taken substantially along line 24—24 of FIG. 23.
Figure 25:
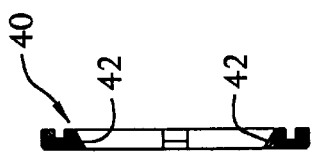
FIG. 25 is a side view of the retaining ring of FIG. 21.
Figure 26:
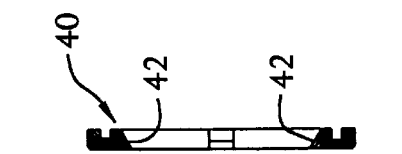
FIG. 26 is a cross-sectional view of the retaining ring of FIG. 21, taken substantially along line 26—26 of FIG. 23.

Referring now in detail to the drawings wherein like reference numbers indicate like elements throughout the several views, there is shown in FIGS. 1–7 a push to close latch 10 in accordance with one preferred embodiment of the present invention. The illustrative device 10 is shown generally comprising a latch stud 20 (see also FIGS. 31–37, a latch stud retaining means 40 (see also FIGS. 6, 7, 21–26 and 31–37), a latch stud driver 60 (see also FIGS. 18–20, 31, and 34–37), a bezel 80 (see also FIGS. 27–37), and a latch stud receptacle 100.

As can be seen in FIGS. 2 and 6, and more particularly in FIG. 33, the latch stud 20 is first mounted to a panel such as door 200. Such mounting can be accomplished by any means known in the art, or in the unique manner recited herein. In this preferred embodiment, the latch stud 20 has an top flange 22 (see e.g. FIG. 17) which sits in a recess 82 in bezel 80. Bezel 80 sits flush against door 200 thereby capturing the latch stud 20 on one side of a panel. Latch stud 20 further has a series of concentric grooves 24 (see FIGS. 15, 16, 32, 33 and 37) that accommodate one-directional flexing teeth 42 in latch stud retaining ring 40. Latch stud 20 is thereby secured on panel 200 by first inserting latch stud 20 into the panel 200, then, by inserting the latch stud retaining ring 40 over the stud 20 until it reaches the concentric grooves 24. Preferably, as can be seen in FIGS. 16 and 33, the concentric grooves are formed in such a manner to have flat surfaces, generally parallel to panel 200 on each groove and an angled surface, sloping downward providing for a "one-way" feature that captures the latch stud 20 on the panel 200, but then does not accommodate easy disassembly.

Latch stud driver 60 is inserted into the latch stud 20 and snaps into place by means of barbed feet 62 mating with orifice 26 in latch stud 20, thereby allowing the stud driver to be interchangeable with outer driver types. For example, shown in the present figures is a slotted driver design 66. Likewise, Phillips, hex, and the like recesses may be used. Alternatively, as can be seen in the latch stud driver 60' of FIGS. 38 and 39, an outwardly extending knob 66' may be used. Integral slots and mating grooves in the respective latch stud driver and latch stud provide for sufficient means to transfer torque from the latch stud driver to the latch stud. Although latch stud driver 60 is depicted as a separate structure, of course, the driver may be integral to the latch stud 20 itself.

Latch stud receptacle 100 is mounted on a second panel 300 as shown in FIGS. 2 and 6, for example by screws or rivets through clearance holes 102. Latch stud receptacle 100 has a female cavity adapted to accept latch stud 20. As seen in FIGS. 4, and more particularly in FIGS. 15 and 16, latch stud 20 has molded in male threads 28. These threads 28 are designed to properly mate with female threads 104 (see FIGS. 8, 11, 12, and 14) in stud receptacle 100.

The thread design on both the receptacle 100 and the latch stud 20 is a crucial feature to the present invention. The threads 104 on the receptacle 100 and the threads 28 on the latch stud 20 are asymmetric. That is, as can be seen in FIGS. 31–33 for the latch stud, the tops of the threads, i.e., looking down from the top of the latch 10, have generally flat top surfaces 27, while the bottom surfaces of the threads 29 is positioned at a downward angle. Similarly, on the receptacle 100, as can be seen in FIG. 14, looking down from the top of the latch 10, the threads 104 have a generally flat bottom surface 105 and an angled top surface 107. These mating threads in combination with a flexible housing as described below, allow the stud 20 to be slammed in place in the stud receptacle 100, where the threads act as barbs that restrict backward axial movement of the latch stud 20 out of the stud receptacle 100 when there is no relative rotation.

To accommodate the "slamming" in or pressing in of the stud 20 into the receptacle 100, the lower portion of the receptacle is constructed from a plurality of cantilevered members 106, preferably four as shown in the accompanying figures. Cantilevered members 106 extend from the front mounting surface 101 of the latch stud receptacle 100 housing, but are integral to the front mounting surface 101 to allow for a slight outward flexing of these cantilevered members 106. It is noted that the receptacle threads 104 are located on the inner surface of the cantilevered members 106. Therefore, when the latch stud 20 is slammed or pressed axially into the latch stud receptacle 100, the angled surface 29 of threads 28 on the latch stud 20 contact the angled surface 107 of threads 104 on the receptacle 100, causing cantilevered members 106 to alternately flex outwardly and then snap back into position as the threads 28, 104 properly align with each other until the latch stud 20 is seated in the receptacle 100. At the seated position, the latch stud threads 28 and the latch stud receptacle threads 106 are again properly aligned with one another.

Once fully seated, if desired, the latch stud 20 can be further manually rotated to more fully seat the latch stud 20 into the latch stud receptacle 100. This is accomplished by a manual clockwise rotation of the threads by using the means to facilitate rotation or screwdriver recess 66 causing further compression.

Due To the "barbed" action of the threads, the flat surfaces 27, 105 do not allow for the latch stud 20 to be axial removed from the latch stud receptacle 100 without rotation. To remove the latch stud 20 from the receptacle 100, the latch stud 20 must be manually rotated in a counterclockwise direction such that the latch stud 20 is unscrewed from the latch stud receptacle.

It is also preferable that the thread design on both the latch stud 20 and receptacle 100 are of a high helix design, as depicted in the figures such that a very small amount of rotation is required to cinch the latch down or disengage the latch. It is also noted that the threads have multiple start points such again for the same reason, i.e. to require only a small amount of rotation to engage or disengage. Preferably only a quarter turn is required to disengage the latch.

It is also noted that the present latch need not be slammed or pressed shut, but may instead by manually screwed shut to engage the latch by use of the threads. Again, this feature is available due to the flat surfaces on the threads as described above.

Another optional feature for the present latch 10 is the incorporation of an anti-vibration feature that ensures that the latch will not vibrate and cause accidental disengagement. A preferred means to accomplish this feature is the use of a plurality of longitudinal ribs 30 (see FIGS. 2, 15, 16, and 31–33). These ribs 30 mate with similarly positioned receptacle ribs 110 (see FIGS. 9, 11, 12 and 14) located on the cantilever members 106. Again here, the cantilever members flex radially outward from an outward position to a seated position. The stud ribs 30 in combination with the receptacle ribs 110 provide a friction surface that must be overcome and thereby keep the stud 20 from rotating with respect to the stud receptacle 100 which such that accidental disengagement of the latch is avoided.

What is claimed is:

1. A latch for attaching a door to a frame, comprising:
    (a) a latch stud for securing to the door by a latch stud retaining means, said latch stud having a stud portion, a threaded portion, and a head portion having a means to facilitate axial rotation, the latch stud retaining means comprises a bezel adjacent the head portion, a plurality of annular concentric grooves on the latch stud adjacent the bezel, and a retaining ring having an outside diameter and an inside diameter, said inside diameter having a plurality of knife edge surfaces extending radially inwardly engageable with the plurality of annular concentric grooves; and
    (b) a stud receptacle for securing to the frame by a stud receptacle retaining means, said stud receptacle having an upper mounting flange and a threaded stud captivation means, said threaded stud captivation means comprising a plurality of cantilever members extending from the upper mounting flange having internal matching threads to the latch stud that flex radially outwardly to allow the latch stud to be longitudinally inserted into said threaded stud captivation means, whereby the latch stud must be manually axially rotated for removal from the threaded stud captivation means by urging the cantilever members outwardly due to interference between the threaded portion of the stud assembly;
    whereby the stud portion of the latch stud is inserted into a hole in the door of a diameter larger than the stud portion of the latch stud and smaller than the bezel of the latch stud and the outside diameter of the retaining ring and the concentric grooves extend through the hole in the door on the opposite side of the bezel and the knife edges of the retaining ring to captivate the latch stud on the door between the bezel and the retaining ring.

2. A latch for attaching a door to a frame, comprising:
    (a) latch stud for securing to the door by a latch stud retaining means, said latch stud having a stud portion, a threaded portion, and a head portion having a means to facilitate axial rotation;
    (b) a stud receptacle for securing to the frame by a stud receptacle retaining means, said stud receptacle having an upper mounting flange and a threaded stud captivation means, said threaded stud captivation means comprising a plurality of cantilever members extending from the upper mounting flange having internal matching threads to the latch stud that flex radially outwardly to allow the latch stud to be longitudinally inserted into said threaded stud captivation means, whereby the latch stud must be manually axially rotated for removal from the threaded stud captivation means by urging the cantilever members outwardly due to interference between the threaded portion of the stud assembly;
    (c) said latch stud retaining means comprises a bezel adjacent the head portion, a plurality of annular concentric grooves on the latch stud adjacent the bezel, and a retaining ring having an outside diameter and an inside diameter, said inside diameter having a plurality of knife edge surfaces extending radially inwardly engageable with the plurality of annular concentric grooves, whereby the stud portion of the latch stud may be inserted into a hole in the door of a diameter larger than the stud portion, of the latch stud and smaller than the bezel of the latch stud and the outside diameter of the retaining ring so that the concentric grooves extend through the hole in the door on the opposite side of the bezel and the knife edges of the retaining ring captivate the latch stud on the door between the bezel and the retaining ring;
    (d) the threaded portion of the latch stud having asymmetric threads that cam the cantilever members outwardly to allow the latch stud to be inserted into the stud receptacle, but firmly secure the latch stud in its axial position when the latch stud is not rotated;
    (e) the stud receptacle having asymmetric threads that cam the cantilever members outwardly to allow the latch stud to be inserted into the stud receptacle, but firmly secure the latch stud in its axial position when the latch stud is not rotated; and
    (f) said means to facilitate rotation is a driver recess to facilitate rotation of the latch stud.

3. The latch of claim 2, wherein the latch stud has a plurality of axial grooves that mate with a plurality of like axial grooves on the stud receptacle adjacent internal threads of the stud receptacle to provide torque resistance of the latch stud with respect to the stud receptacle.

4. The latch of claim 2, wherein the latch stud has interchangeable driver members, whereby one of numerous driver recesses is selectable.

* * * * *